(12) United States Patent
Orlowski et al.

(10) Patent No.: US 10,677,907 B2
(45) Date of Patent: Jun. 9, 2020

(54) METHOD TO DETERMINE THE ORIENTATION OF A TARGET VEHICLE

(71) Applicant: Aptiv Technologies Limited, St. Michael OT (BB)

(72) Inventors: Mateusz Orlowski, Cracow (PL); Dariusz Cieslar, Cracow (PL); Mateusz Stachnik, Gdow (PL)

(73) Assignee: Aptiv Technologies Limited (BB)

( * ) Notice: Subject to any disclaimer, the term of this patent is extended or adjusted under 35 U.S.C. 154(b) by 189 days.

(21) Appl. No.: 16/003,710

(22) Filed: Jun. 8, 2018

(65) Prior Publication Data

US 2019/0004166 A1    Jan. 3, 2019

(30) Foreign Application Priority Data

Jun. 29, 2017    (EP) .................................... 17178580

(51) Int. Cl.
*G06F 11/30* (2006.01)
*G01S 13/58* (2006.01)
(Continued)

(52) U.S. Cl.
CPC ............ *G01S 13/58* (2013.01); *G01S 7/4802* (2013.01); *G01S 7/4808* (2013.01); *G01S 13/42* (2013.01);
(Continued)

(58) Field of Classification Search
CPC ........................................................ G01S 13/58
See application file for complete search history.

(56) References Cited

U.S. PATENT DOCUMENTS

2018/0356498 A1* 12/2018 Stachnik ............... G01S 13/584

OTHER PUBLICATIONS

Roos Fabian et al.: "Estimation of the orientation of vehicles in high-resolution radar images", Apr. 27, 2015, pp. 1-4 (Year: 2015).*
(Continued)

*Primary Examiner* — Phuong Huynh
(74) *Attorney, Agent, or Firm* — Joseph V. Bonadies

(57) ABSTRACT

A method to determine the heading or orientation of a target vehicle by a host vehicle, said host vehicle equipped with a lidar or radar system, said system including a sensor unit adapted to receive signals emitted from said host vehicle and reflected by said target vehicle, comprising: a) determining at least one reference angle being an initial estimate of target heading or orientation (β); b) emitting a signal from said system and determining a plurality of point radar or lidar detections belonging to said a target vehicle, said point detections having co-ordinates in the horizontal plane; c) formulating an initial rectangular boundary box from said point detections, where the bounding box is formulated such that such that two edges of the boundary box are drawn parallel to the reference angle and two sides are perpendicular to the reference angle and such that all the detections are either on the bounding box sides or lay within the bounding box and each edge has at least one detection point on it; d) for each point on lying on an edge of the boundary box, rotating a line coincident with the respective edge clockwise and anticlockwise until said line intersects another point detection or until a maximum angle of rotation is performed; and each time when said line intersects said another point detection, determining a correction angle $\Delta i$, where the correction angle is such that applied to the reference angle it gives an orientation candidate angle $\gamma i$; e) in respect of each orientation candidate angle $\gamma i$/correction angle $\Delta i$, determining a cost function; and f) selecting that orientation candidate angle having the lowest cost function.

8 Claims, 7 Drawing Sheets

(51) Int. Cl.
  *G01S 17/58* (2006.01)
  *G01S 13/931* (2020.01)
  *G01S 13/42* (2006.01)
  *G01S 7/48* (2006.01)
  *G01S 13/72* (2006.01)
  *G01S 17/66* (2006.01)
  *G01S 17/931* (2020.01)
  G01S 7/295 (2006.01)
  G01S 7/41 (2006.01)

(52) U.S. Cl.
  CPC .......... *G01S 13/726* (2013.01); *G01S 13/931* (2013.01); *G01S 17/58* (2013.01); *G01S 17/66* (2013.01); *G01S 17/931* (2020.01); *G01S 7/295* (2013.01); *G01S 7/41* (2013.01); *G01S 13/589* (2013.01); *G01S 2013/932* (2020.01); *G01S 2013/93271* (2020.01)

(56) References Cited

OTHER PUBLICATIONS

Pawel Kmiotek et al: "Representing and Tracking of Dynamics Objects using Oriented Bounding Box and Extended Kalman Filter"; Oct. 12, 2008, pp. 322-328.
Roos Fabian et al: "Estimation of the orientation of vehicles in high-resolution radar images", Apr. 27, 2015, pp. 1-4.
Toussaint G T Ed—Protonotarios E N et al: "Solving Geometric Problems With The "rotating Calipers"", May 24, 1983, p. 1-04.

* cited by examiner

METHOD TO DETERMINE THE ORIENTATION OF A TARGET VEHICLE

TECHNICAL FIELD OF INVENTION

This invention relates to a method to determine the orientation of a target vehicle by a host vehicle equipped with e.g. a radar or lidar system. The method uses an initial estimate of orientation, as well as using point detections from reflections of radar or lidar signals emitted by the host vehicle and reflected from the target vehicle to refine the initial estimate. Aspects of the invention are applicable (but not limited) to the estimation of the orientation of vehicles for automotive perception systems and can be used in Active Safety, Driver Assistance and Autonomous Driving applications.

BACKGROUND OF INVENTION

Orientation of an object (target such another vehicle) is an important state parameter to be estimated in automotive systems. Although methodology to determine orientation is known these suffer from accuracy problems. Throughout the specification reference to orientations should be understood to include alternatively reference to heading. Thus, for a vehicle travelling in a straight line, the heading will be the same as orientation.

Typically, (host) vehicles may be equipped with radar or lidar systems used to classify the environment in the vicinity of the vehicle such as to e.g. detect moving or static objects around the vehicle. Such systems are used to for example, to estimate the motion state or orientation of other vehicles for automotive perception systems and can be used in Active Safety, Driver Assistance and Autonomous Driving applications. Said radar systems including a radar sensor unit adapted to receive signals emitted from said host vehicle and reflected by said target. Generally, the data captured comprise point detections from emitting a radar signal at a single time-point instance and determining from a plurality of point radar detections measurements therefrom captured from said radar sensor unit. These radar detections, can identify a target vehicle e.g. by a cluster of point detections. These point detections are assumed to be generally from the outside of the vehicle and can be regarded as having x and y coordinates in the horizontal plane (i.e. on a 2-dimention plan view/map). Alternatively, the point detections may be considered polar co-ordinates of range and azimuth.

Known techniques can determine the orientation (or heading) of a vehicle e.g. by tracking a vehicle by radar or lidar systems, and are explained hereinafter. However often these techniques have problems with accuracy. Also, issue with tracking algorithms are introduced delay by time filtering.

It is an object of the invention to correct or refine an orientation estimate of a target such as another vehicle using the spatial distribution of detections from an extended radar target. The technique offers an improvement of estimation accuracy in comparison to methods that do not use spatial information of clustered detections are also specified.

SUMMARY OF THE INVENTION

In one aspect of the invention is provided a method to determine the heading or orientation of a target vehicle by a host vehicle, said host vehicle equipped with a lidar or radar system, said system including a sensor unit adapted to receive signals emitted from said host vehicle and reflected by said target vehicle, comprising: a) determining at least one reference angle being an initial estimate of target heading or orientation ($\beta$);

b) emitting a signal from said system and determining a plurality of point radar or lidar detections belonging to said a target vehicle, said point detections having co-ordinates in the horizontal plane;

c) formulating an initial rectangular boundary box from said point detections, where the bounding box is formulated such that such that two edges of the boundary box are drawn parallel to the reference angle and two sides are perpendicular to the reference angle and such that all the detections are either on the bounding box sides or lay within the bounding box and each edge has at least one detection point on it;

d) for each point on lying on an edge of the boundary box, rotating a line coincident with the respective edge clockwise and anticlockwise until said line intersects another point detection or until a maximum angle of rotation is performed; and each time when said line intersects said another point detection, determining a correction angle $\Delta i$, where the correction angle is such that applied to the reference angle it gives an orientation candidate angle $\gamma i$;

e) in respect of each orientation candidate angle $\gamma i$/correction angle $\Delta i$, determining a cost function; and f) selecting that orientation candidate angle having the lowest cost function.

Step d) may only performed in respect of detection points lying on visible edges.

If two values of correction angle ($\Delta i$) are found in respect of respective clockwise and anticlockwise rotation with respect to a detection point, the method may only formulate an orientation candidate from the smallest of the two correction angles ($\Delta i$).

Step f) may comprise selecting the orientation candidate with the smallest value of the correction angle $\Delta i$.

Step d) may comprise determining the distance between the said point on lying on an edge of the initial boundary box, and the point detection intersect by said line, and wherein said step f) selects the orientation candidate angle formulated for the instance where said distance is largest.

For each case in step d) when said line intersects said another point detection, the method may involve formulating a revised boundary box, where one edge of said boundary box is formed coincident with a line from said point lying on said edge of the initial boundary box and said point detection intersect by the said line which is rotated, and where another edge is parallel with said edge of said revised boundary box and the other two edges are perpendicular thereto and such and each edge has at least one detection point on it.

Said cost function may be the area of said revised boundary box.

Said cost function may be the sum the shortest distance between each point detection not lying on the revised boundary box and its nearest edge.

BRIEF DESCRIPTION OF DRAWINGS

The present invention will now be described, by way of example with reference to the accompanying drawings, in which.

The present invention is now described by way of example with reference to the accompanying drawings in which.

DETAILED DESCRIPTION

Figure 1:
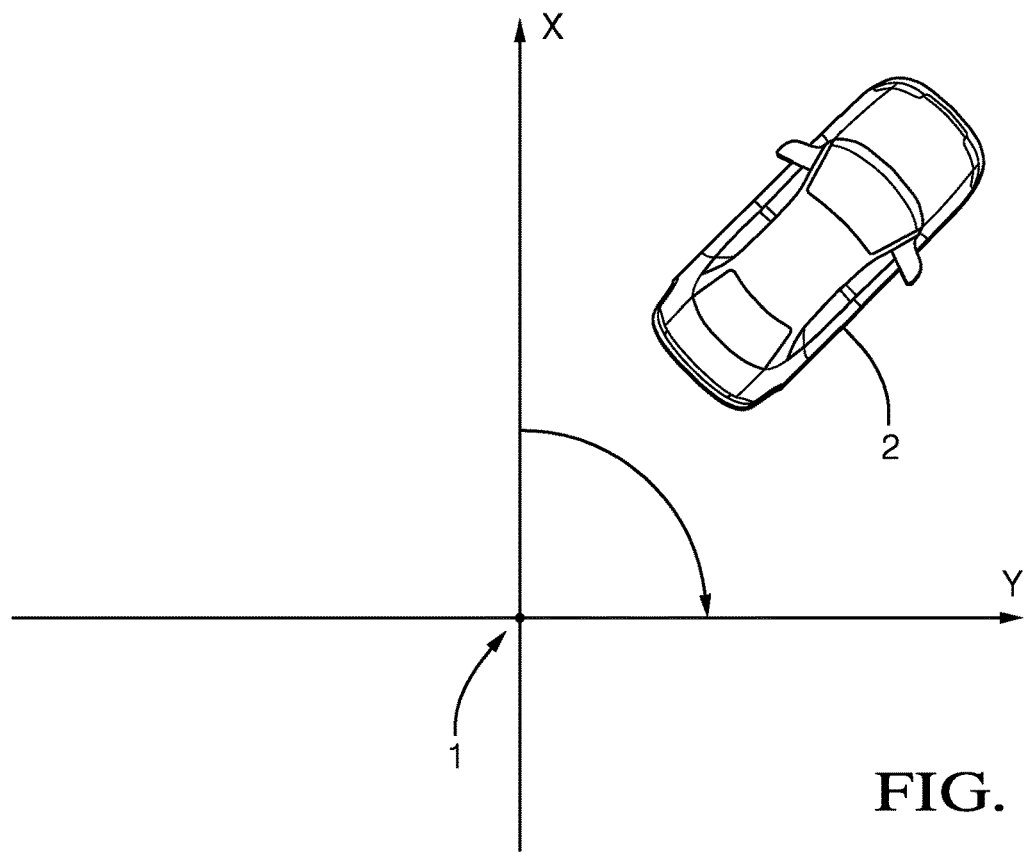
FIG. 1 shows a target co-ordinate system.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

This disclosure relates to a method of determining an estimation of orientation using e.g. Doppler radar measurements. This disclosure details a method (which could be referred to as Geometry Based Orientation or GBO) for determining or correcting the orientation estimate of a target such as another vehicle using the spatial distribution of detections from an extended radar target.

The technique offers an improvement of estimation accuracy in comparison to algorithms that do not use spatial information of clustered detections are also specified.

The methodology in examples can be regarded as pseudo-measurement of an object orientation. The term "pseudo-measurement" is defined here as an instantaneous estimate from a single measurement instance. The method may be performed with plausibility checks, and does not need to use time-filtering. Furthermore, no restriction needs to be made about object and host (vehicle) yaw rates. This means there needs to be no assumption that the object's over-the-ground velocity vector is aligned along the direction of object orientation.

It is assumed that the target is a distributed target i.e. not a point target such that a plurality of raw detections from the same target at the same time can be obtained. It is assumed that there is appropriate clusterization of raw detections from a single target into one group. The approximation of the distributed target can be assumed by a rigid body model which is appropriate for vehicles, although usually not applicable to vulnerable road users.

In one aspect, the approximation of the target geometry can be by a single 2D oriented bounding box (OBB).

The host vehicle is equipped with radar means such as a radar transmit and receive unit, such that (raw) radar reflection detection from the target (other vehicle) can be obtained. Each raw detection may be attributed with the position relative to the sensor FOV, Cartesian position, or Polar (azimuth angle, range). At least one initial heading estimate is assumed e.g. derived from a different algorithm, e.g. Cloud algorithm, Tracking algorithm In the subsequent concept description, the following conventions and definitions are used:

World Coordinate System

As is convention an inertial coordinate system with the origin fixed to a point in space is used—it is assumed the co-ordinate system does not move and does not rotate. Conventionally the coordinate system is right-handed; the Y-axis orthogonal to the X-axis, pointing to the right; the Z-axis pointing into the page and positive rotation is to the right of the X-axis; see FIG. 1 which shows such a co-ordinate system with origin 1 and a non-ego vehicle 2.

Vehicle Coordinate System

Figure 2:
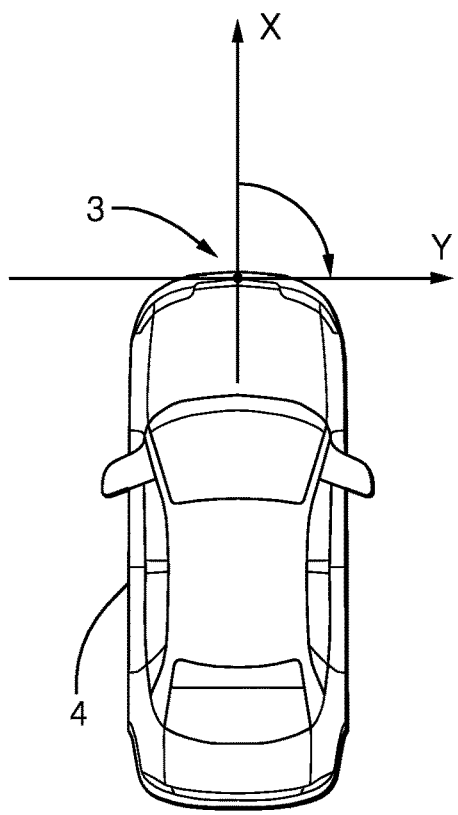
FIG. 2 shows a vehicle coordinate system.

The origin may be located at the center of the front bumper 3 of the host vehicle 4 as shown by FIG. 2. The X-axis is parallel to the longitudinal axis of the vehicle. The coordinate system is right-handed with the Y-axis orthogonal to the X-axis, pointing to the right, the Z-axis pointing into the page and positive rotation to the right of the X-axis.

Sensor Coordinate System

Figure 3:
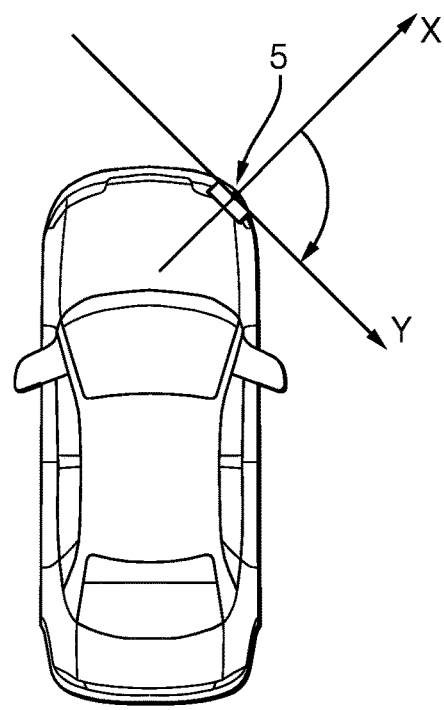
FIG. 3 shows a sensor coordinate system.

Origin located at the center of the sensor unit/radome. The X-axis is perpendicular to the sensor radome, pointing away from the radome. The coordinate system is right-handed: Y-axis orthogonal to the X-axis, pointing to the right; Z-axis pointing into the page; Positive rotation to the right of the X-axis. FIG. 3 shows a sensor origin 5.

The problem to be solved can be phrased as follows: provide a plausible estimate for the orientation of the OBB of an extended target that is supported by a spatial distribution of detections captured in a single measurement instance of a Doppler radar.

Prior Art

This section briefly reviews the relevant literature available in public domain and company internal reports. Building blocks for the approach proposed in this ROI are acknowledged and their sources identified.

Enhanced Oriented Bounding Box

In G. Toussaint, "Solving Geometric Problems with the Rotating Calipers," Proceedings of IEEE MELECON 83, 1983. a rotating calipers algorithm for fitting minimal rectangle enclosing a polygon is presented. The procedure involves the determination of a convex hull of all points assigned to a specific object. After this step a bounding box is spread on extreme values of points position and then it is rotated so that in each step it is collinear with one side of the convex hull.

In F. Roos, D. Kellner, J. Klappsetin, J. Dickmann, K. Dietmayer, K. Muller-Glaser and C. Waldschmidt, "Estimation of the Orientation of Vehicles in High-Resolution Radar Images," in IEEE MTT-S International Conference on Microwaves for Intelligent Mobility, San Diego, 2015. the Enhanced Oriented Bounding Box algorithm for geometrical approach to the estimation of orientation for high-resolution radar images was considered. The method does not use time filtering and works only on single radar measurement. The algorithm is an enhancement and adjustment of the method presented in before for target vehicle orientation estimation. The algorithm iteratively ignores consecutive points of a convex hull, because detections may lay outside the vehicle (e.g. due to measurement error or poor clusterization). Additionally, for each fitted bounding box a quality factor is evaluated. The evaluation metrics penalize the size of bounding box, which should be as small as possible. The distance of each detection to the nearest box edge is determined; the distances are summed over all detections;

Similar, spatial approach for estimating heading also based on the Rotating Calipers algorithm for LIDAR applications is known where the Rotating Calipers algorithm is extended by assuming symmetry of object geometry, which is then used to project the non-visible part of the target by means of mirrored detection points of the visible side. The authors claim this result in a more stable and accurate constriction of a bounding box on a given set of detections.

In the above paper the authors demonstrated that this solution works for the estimation of direction of a vehicle represented by OBB using only Cartesian position of detections from a single radar measurement. The main drawback of that solution is a high computation time and the requirement for a relatively high number of detections from the target vehicle. Outcome of procedure however is fitted bounding box without exact heading direction estimated. There is however an orientation ambiguity as a result of fitting bounding box only (without specific direction of movement). Additionally, it has been determined that in contrast to LIDAR or vision sensors, a relatively low geometric accuracy of Doppler radars usually makes the spatial analysis of shape and orientation inaccurate and not robust.

OBB Orientation Estimation Algorithms

There are several different algorithms for estimating the orientation of bounding boxes for spatially distributed points. They are often based on geometrical alignment of detection in the Cartesian coordinate system. Some of them are L-fit or the Hough transform.

The Cloud Algorithm

The case of a straight-line moving distributed target has been considered. This restriction simplifies the estimation problem as the velocity vectors at the location of each raw detections are identical, i.e.:

$$V_{t,i} = [u_{t,i}, v_{t,i}]^T = [u_t, v_t]^T = V_t \text{ for } i=1,\ldots,m$$

The Cloud Algorithm (CA) can estimate over-the-ground lateral $v_t$ and longitudinal $u_t$ velocity of the "cloud" of detections coming from the same target.

This can be achieved by Least Square solution to the problem defined as follows:

$$\dot{r}_{i,cmp} = [\cos\theta_i \quad \sin\theta_i] \begin{bmatrix} u_t \\ v_t \end{bmatrix}.$$

The algorithm is to be a very effective technique for instantaneous estimation of target velocity.

Additionally, under the additional assumption of a negligible sideslip, the angle $$\hat{\gamma}_t = \tan^{-1}(\hat{v}_t/\hat{u}_t)$$

can be used as an estimate of the targets heading.

The same problem and the same theoretical basis for the estimation of lateral velocity of a straight line moving object was considered. The authors proposed enhancement to the Cloud Algorithm by means of: Executing RANSAC algorithm to identify outliers Executing orthogonal distance regression (ODR) to solve error-in-variables problem for the modified formulation of the original problem. This improved algorithm provides d improved robustness in comparison to the original Cloud Algorithm solution. Computational complexity and the requirement to solve an optimization problem are the major drawbacks of the proposed approach, especially when an application in a production embedded system is to be considered. Additionally, yawing targets may cause serious perturbations and significant errors in heading estimations.

Outline of the Invention

The contribution of this invention includes: enabling the application as instantaneous pseudo-measurement for the orientation of an extended target; adaptation of an algorithm for selecting most reliable orientation estimate; and conditional execution of novel methodology, based on the quality of already estimated orientation.

The approach conditionally provides instantaneous orientation estimation of objects when some initial orientation angle candidate is available and allows refining the orientation/heading estimation for yawing targets. The approach (in contrast to Cloud Algorithm) can use wheel spin detections (reflections from turning wheels of target object with range rate which can significantly differ from range rate of reflections from vehicle body). The approach may assess several orientation candidates, including the initial guesses from pre-processing. The method is calibratable by means of cost function parameters and in principle does not require filtering/tracking. The approach does not rely on any target motion model and is suitable for application in production embedded systems because of its low computational complexity. The approach can be immediately used in state-of-art short range radars for estimation of objects at low range (up to about 40 meters). The approach in principle can be used in LIDARs systems.

DETAILED DESCRIPTION OF THE INVENTION

Methodology of the invention will now be described with reference to FIGS. 4 to 13, so steps of the procedure of geometry based orientation determination are presented below.

Step 1

Figure 4:
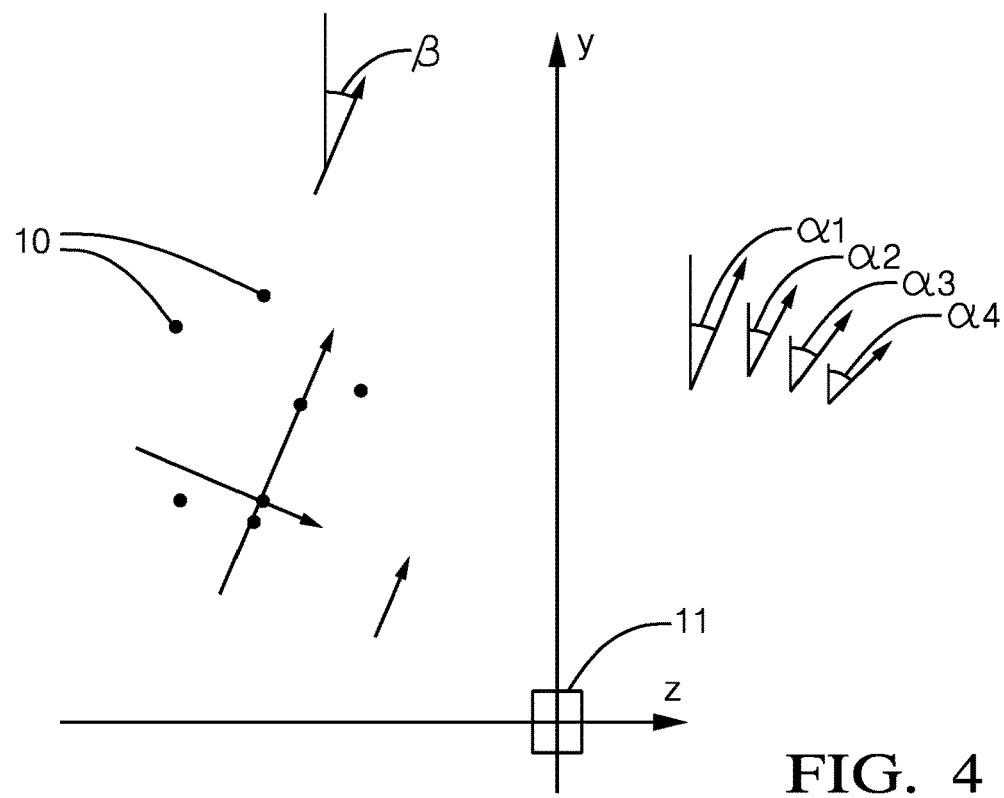
FIG. 4 shows a schematic representation of point data detections from a target vehicle, detected by a host vehicle.

In an initial step, raw detection data comprising detection points in time are obtained in respect of a target vehicle. These may be obtained by on-board radar or lidar systems on the host vehicle. FIG. 4 shows a schematic representation of point data detections 10 from a target vehicle, detected by a host vehicle 11, being located at the origin of a co-ordinate system. In this step, raw detection data (representing detection points assumed to be on the outside perimeter of said target vehicle) are thus the point detections which belong to a target vehicle. So, this method may use techniques to identify a cluster of point detections likely to belong to the same vehicle. Thus, the figure illustrates raw data used by the method, and may be obtained by the host vehicle from radar systems as known in the art.

So, the raw data provides for point detections. It is to be noted that the raw detections may be references by the distance (radial) from the point detection to the host vehicle r and the azimuthal angle of the point detection with respect to the host vehicle θ are obtained. So, in other words, at an instantaneous point in time the host vehicle which is equipped with a radar system send out a radar signal and receive reflected point detections data which are identified as coming from the same target. Known algorithms for clustering can be used. So, the raw data is the Cartesian or polar co-ordinates of the point detection assumed to come from a rigid distributed target such as a vehicle.

Step 2

At least one initial orientation estimate is assumed or determined. This may for example be derived from other algorithms such as the Cloud algorithm described above or any tracking algorithm. So, in other words an e.g. geometry based orientation algorithm may be run to provide the initial orientation estimate or initial reference angle β. In examples, there may be more than one initial orientation estimate/orientation angle. There may be an optional step of determining if the number of available detections is above a calibratable threshold or if the initial estimates of orientation are not verified to be sufficiently reliable. The initial orientation or reference angle will be referred to as β, which is shown in FIG. 4.

Step 3

Here a rectangular boundary box is formulated, which is eventually orientated with respect to local co-ordinate system.

This procedure includes determining a boundary box 12 with respect to the target vehicle from the point detections and assumed heading angle β. This may be assumed for a vehicle, to be a rectangular boundary box, and may be derived from those points of detection which are at the extremities. A rectangular bounding box is thus formulated, such that two sides of the boundary box 13, 14 are drawn parallel to the reference angle and two sides (15, 16) are drawn perpendicular to the reference angle and such that these sides go through the detections points on the extremities; in other words, all the detections are either on the bounding box sides or lay within the bounding box. Thus at least one different point detection will be coincident with each side of the bounding box, and all point detections are on the boundary box or contained within it.

Figure 5:
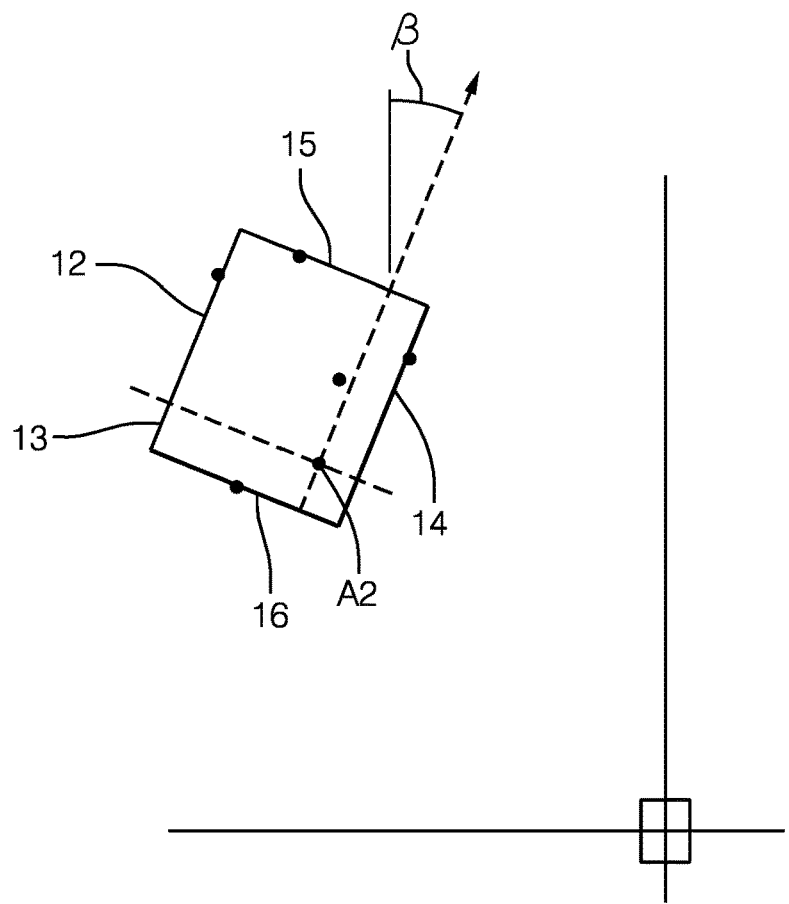
FIG. 5 shows how a bounding box is formulated from the point detection data.

It is to be noted that there are two sides of the boundary box 14 and 16 are visible which are closest (effectively visible) to the host vehicle and drawn in bold in FIG. 5. In the example these sides are the bottom and right sides. This is important to note as will be clear later. FIG. 5 shows the boundary box drawn with respect to the point detections and heading angle β.

Figure 6:
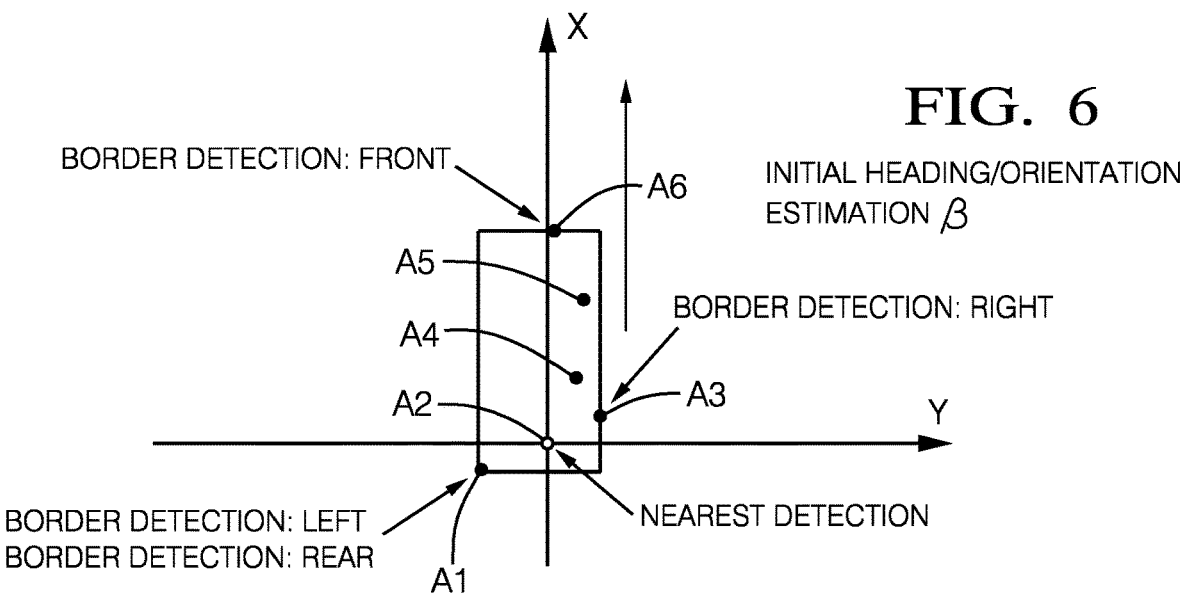
FIGS. 6, 7, and 8 illustrate methodology according to one aspect of the invention.

So, the point detections are used to formulate a boundary box which is then aligned with a local co-ordinate system, where the y-axis and the two sides of the rectangle are aligned in the direction of the reference angle as shown in FIG. 6. In FIG. 6 the point detections are referred to as A1, A2, A3, A4 A5, and A6. The origin of the local co-ordinate system may such that point detection closest to the host vehicle (A2) is determined (this point is shown in FIG. 5). A line is drawn through this at the reference angle to mark the y axis. The results are shown in FIG. 6.

So, to recap, this step involves formation of a bounding box and a transformation (x and y positions of detections) to a local object coordinate system which is oriented along the reference angle (based on original heading/orientation) and has the origin e.g. in the nearest detection. So, FIG. 6 shows the results of this step and shows the orientation angle directly on the y-axis and the point detections aligned with this. As mentioned in the figures the local coordinate system is where point detection A2 is the origin though any point may be taken as the origin. The main thing is that the point detections are aligned along the reference angle initially computed.

So, to recap FIG. 6 shows the local coordinate reference system in respect to the detections is drawn up by arranging boundary box to be aligned with the x and y axes of the co-ordinate systems such that the sides of the bounding box are parallel and perpendicular to the ax and y axis and that origin runs through the nearest detection, so the front boundary and rear boundary are parallel to the x-axis of the local co-ordinate system and the side of the boxes are parallel with the y-axis. The y-axis is thus therefore orientated with the reference angle β. It is not strictly necessary to orientate the box to the local co-ordinate system in line with the initial estimate of heading/orientation but this has been done for improved understanding.

Step 4

This next procedure is used to provide a series of orientation candidates (angles) which are then processed further/analyzed to find which is the optimum; i.e. most suitable in terms of likely to be the most accurate. The output therefore is a series of orientation candidate angles referred to generally as γi that is as γ1, γ2, γ3, γ4 etc., which vary somewhat around the initial orientation candidate. It is the task of the methodology to determine these candidate orientation angles and select the most likely one i.e. that one which is most likely to be the accurate angle based on the distribution of point detections. These candidate angles are shown in FIG. 4.

Back to FIG. 6, the following procedure is repeated for a plurality of each point detections which lie on the edges of the boundary box; preferably for each of these point detections. This may preferably be done with respect to only visible edges i.e. point detections on visible sides of the bounding box with respect to the host vehicle that is 14 and 16.

So, each point detection which is on (e.g. visible) edge of the boundary box may be selected. In FIG. 6 these are points A1, A3 and A6. In FIG. 6, the visible sides (edges of the bounding box) are marked with reference numerals 14 and 164, and where only the points selected lie on visible edges these would be thus points A3 on the right-hand side (visible border 14) and point A1 on the bottom side (visible) border 16 (representing the rear of the target vehicle).

Figure 7:
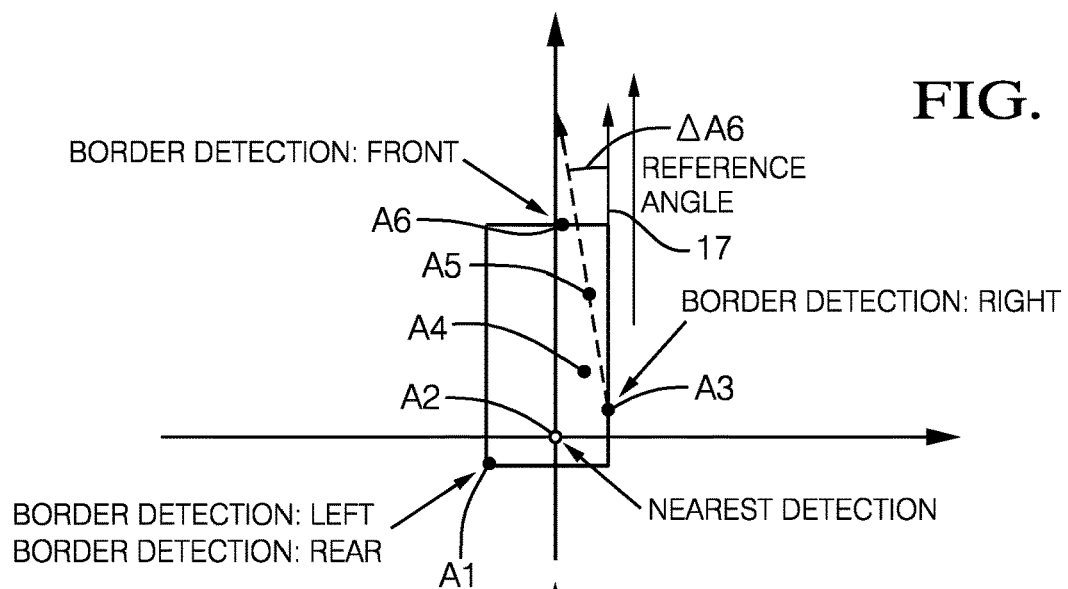
Figure 8:
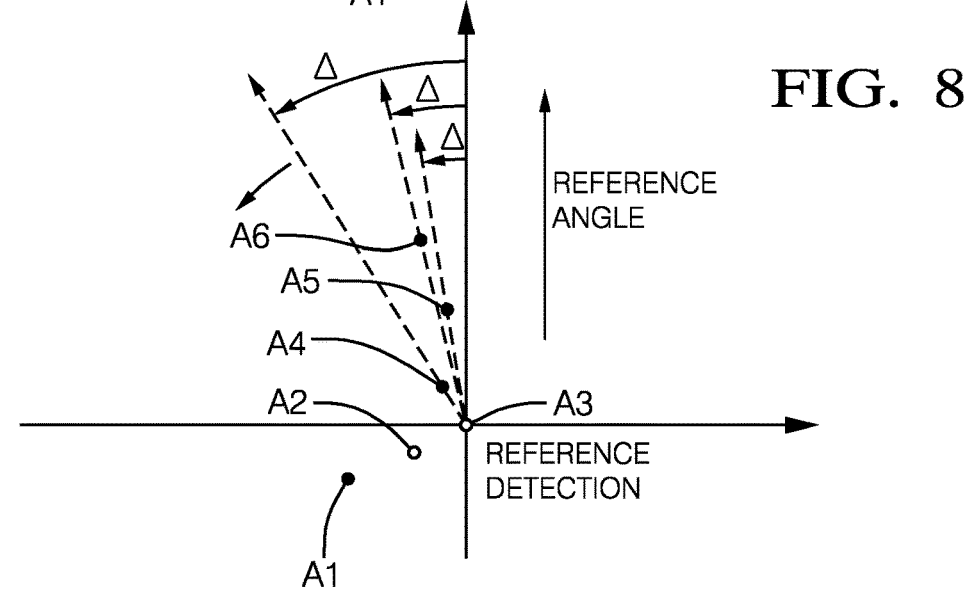

In the next step, for each of the selected point detections determined from above step (so for A1, A3 and A6) a line running through each selected point and parallel and coincident with the border/edge on which the point lies is swung (rotated) both clockwise and anticlockwise about the selected point until it reaches another point detection. The angle through which the line is swung (through which it moves to reach the point) is then noted, and is referred to as an adjustment angle $\Delta i$ and forms the basis of the candidate heading angle $\gamma i$. Thus, the candidate heading angle $\gamma i$ is $\beta+\Delta i$ where i=1 to m, where m is the number of times a valid value is obtained from the process. It is to be noted that the value of $\Delta i$ may be positive or negative depending on whether the rotation was clockwise or anticlockwise So, for the point A3 a line 17 parallel and coincident with the border on which it is co-incident—in this case the right-hand border—is rotated anticlockwise until it reaches i.e. it is incident with the next point detection. Here the line 17 (extended border line equivalent) is rotated anti-clockwise—the first point the border line meets (similar to a radar scanner screen) is point A5. This is shown in FIG. 7 and schematically the angle $\Delta$ is shown in FIG. 8. The angle through which it moves is $\Delta A6$ anticlockwise which may be for examples 3 degrees—this may be regarded as $\Delta 1$. So, the angle adjustment resulting from intersecting detection A5 is the smallest and therefore it leads to the orientation correction candidate considered for the anti-clockwise rotation for the right edge $\gamma 1$ which is $\beta+\Delta 1$ (or $\beta+\Delta$ A6anticlockwise) where $\Delta 1$ is a negative value (anticlockwise). The process is repeated moving the line 17 this time clockwise about point A3. However, it is to be noted the rotation clockwise must be through a very large angle before the line 17 reaches the next point A1/A2. For this reason, the procedures may have a maximum angle (say 10 degrees) for which angle or orientation more than this are disregarded. Thus, in this case the angle is sufficiently large that result of this part of the procedure for point A3 is thus just $\Delta 1$ which is effectively an adjustment to be made to the reference angle to find an orientation angle (candidate). It may be that two values of adjustment $\Delta$ angle (found by clockwise and anti-clockwise rotation) $\Delta 1$, $\Delta 2$ are found in respect of point A3 which are less than the threshold. It may be that only the adjustment angle with the lowest value may be used. The result is that for each point, may result in 0, 1, or 2 values of $\Delta$. This process is then repeated for points A1 and A6. As mentioned the process may preferably be performed for point that lie only on the visible edges, in this case A1 and A3

So, point A1 is also on a border and so a line through this and parallel with the border is swung rotated around the point A1 anticlockwise until it reaches the next point detection which would be A2. So again, the angular rotation is noted a $\Delta 2$. Again, this process is repeated for the line rotating clockwise, the first detection it will intersect will be point A6—however this requires a large rotation above a maximum threshold and so the result will be ignored.

The process may also be repeated for A6.

As a result of the procedure, for each point on an edge, a series of correction or adjustment angles $\Delta i$ are determined for the initial heading candidate. These adjustment angles i (effectively representing the orientation candidates $\gamma i=\gamma 1$, $\gamma 2$ $\gamma 3$, $\gamma 4$ etc. are then analyzed to detect that which is the most likely to be the most accurate. This may be done in several ways, as will be explained later.

So, the procedure may be alternatively described as for each point detection on a (e.g. preferably a visible) border, rotating a line coincident with said point and extended line with the respective edge) clockwise and anticlockwise about said detection, to find an adjustment angle $\Delta$ which is the minimum azimuth from the appropriate subset of detections in the aligned coordinate system; for each visible edge by rotating clockwise and anti-clockwise the reference angle until it meets another detection within the group of detections associated to that object. The output of this step gives a number of values of candidate orientation angles Step 5

As mentioned the adjustment angles $\Delta i$ that is $\Delta 1$, $\Delta 2$, $\Delta 3$, $\Delta 4$, . . . (effectively representing the orientation candidates $\gamma i$ that is $\gamma 1$, $\gamma 2$, $\gamma 3$, $\gamma 4$, . . . ) are then used in analysis to detect that which is the most likely to be the most accurate orientation candidate. This may be done in several ways, as will be explained later.

Essentially here in this step, the candidate orientation angle or value of $\Delta$ may be selected which has the lowest cost (which is result of cost function). Thus, a cost function must be determined for each candidate orientation found above, and that with the lowest cost function is considered as the final orientation estimate for the object. Cost fit analysis can be performed in various ways but effectively determine how well the detected points conform to a vehicle or rectangle having point detections located on the boundary on the box and whose orientation is aligned with the orientation candidate.

Some example of cost fit analysis will be explained later.

In addition, there may be plausibility checks made on the values of $\Delta i/\gamma i$ whose values are ignored if they don't meet certain criteria. So, a candidate may be considered as implausible is the resulting deviation $\Delta$ from a reference angle is above some threshold or the dimensions of a revised boundary box (as explained later) aligned along the candidate orientation exceeds the maximum plausible dimensions These conditions may be implemented as binary plausibility gates or as additional factors included in the cost function for candidate evaluation.

Revised Boundary Box

In some of the methods (cost function) to select which values of $\Delta i$ (so $\Delta 1$, $\Delta 2$, $\Delta 3$ etc.) is the best, and thus which orientation candidate $\gamma i$ (so $\gamma 1$, $\gamma 3$, . . . ) is the best most likely accurate one, a revised boundary box needs to be formulated.

Figure 9:
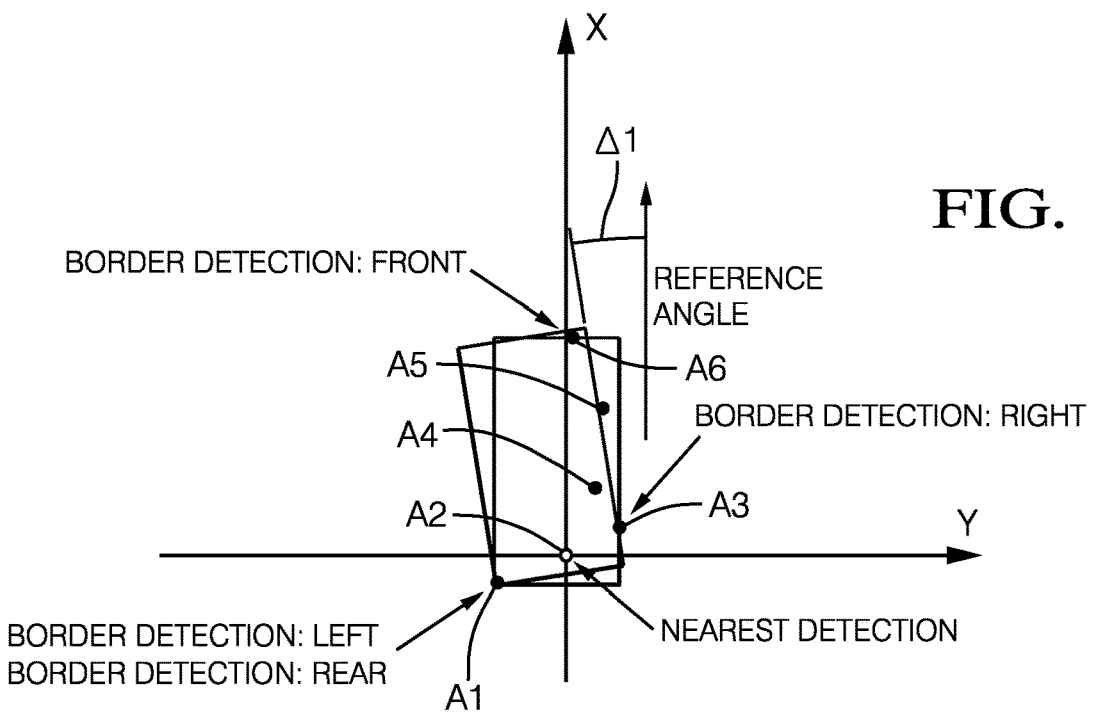
FIG. 9 illustrates an example of how a revised bounding box is formulated.

This angle $\Delta$ is used to reformulate a revised bounding box 18 as shown in FIG. 9 for $\Delta 1$. Here a new rectangular boundary box 18 is formulated from the results of the previous step where the edges of the previous boundary box are rotated about the adjustment angle. So, in the example for the angle $\Delta 1$, found by rotating the right-hand edge anticlockwise about point A3, a new border is drawn at an angle $\Delta 1$ to the co-ordinate system such that the right-hand side (visible edge) is now coincident with points A3 and A5. The remaining box edges are drawn perpendicular and parallel with this new edge of the boundary box, i.e. perpendicular and parallel with the angle $\Delta 1$ respectively. The new boundary box may be formulated in various ways but the important thing is that the edges are now perpendicular and parallel with the angle $\Delta 1$. The boundary box may be redrawn such that the edges encapsulate all the point detection with the point detections at the extremities coincident with the new bounding box perimeters (sides). In other words, all detection points lie on the sides or the reformulated boundary box or are contained within it. Thus at least one different point detection will be coincident with each side of the bounding box. An example of the new reformulated boundary box with respect to Δ1 found by anticlockwise rotation of line 17 about A3 until it intersects A5 is shown in FIG. 9.

Selection of Candidates and Cost Fit Analysis

Figure 10:
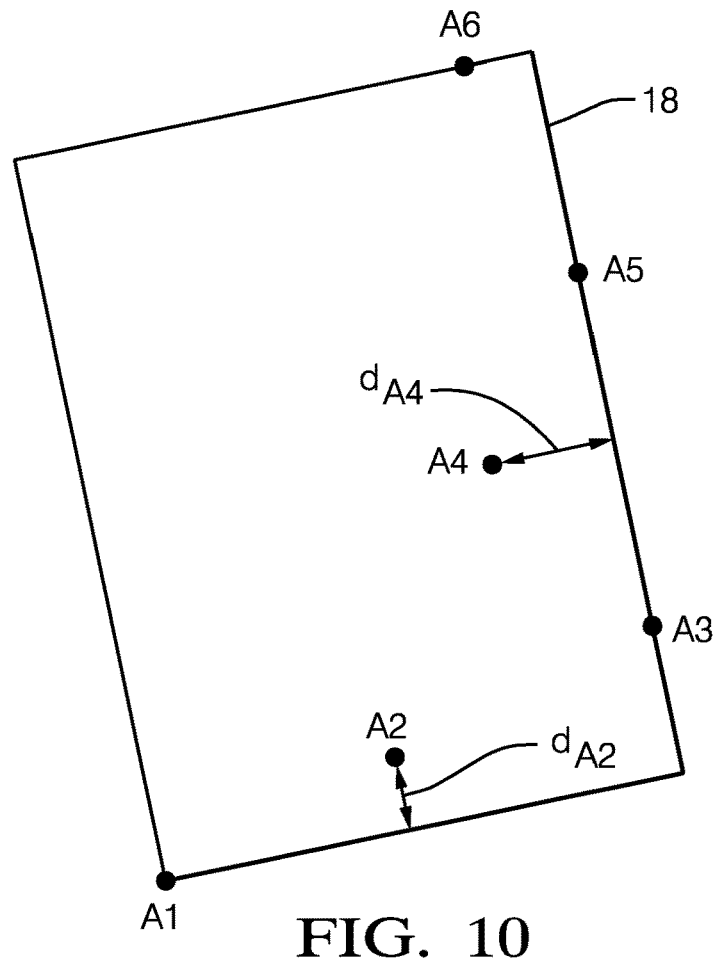
FIG. 10 illustrates how in one example how a cost function can be obtained from a revised bounding box.

As mentioned above, after the identification of valid orientation candidates Δi/γi each of them may be assigned a cost of fit value. The cost function used for calculating this value depends on the set scalar factors (or metrics). One or more parameters may be used. The following details cost fit methods which can be used in Step 5 above.

a) In a simple method the deviation of heading candidate γi from reference angle β is determined and the smallest selected. In other words, the smallest value of Δi is selected with the corresponding candidate orientation angle γi.

b) In one example the cost fit is determined from considerations of the point detections and the new boundaries of the new/revised boundary box. FIG. 10 shows a revised boundary box with point detections A1 A2 A3 A4 A5 and A6 from the example above. Here all the detections apart from A2 and A4 lie on the revised bounding box edges.

Thus, here the shortest distance from the points not on the border/edges (that is A2 and A4) to the edges/border are determined and summed. The case (candidate orientation angle) with the lowest sum is selected. These distances are shown as dA2 and dA4 respectively. Thus, the cost function here is (dA2+dA4); the lowest is selected.

Naturally the lower this sum or cost function the more the point detections are aligned to conform to edge detections of a rectangular vehicle. It is to be noted that in practical implementations only a few points will lie on the new edges and most will not. So, in other words the smaller the cumulative distance of the distance of the point detections to the boundary box the better the fit of the box to the points are and the better the candidate i.e., the determined orientation candidate angle is likely to correspond to the orientation in the real world. So, this method is based on the cumulative distance from each detection to its nearest edge of the boundary box is determined c) In another step the area of the resulting revised boundary box is determined. So, for each value of Δi (and corresponding orientation candidate) the respective revised boundary box area is considered. The best candidate is that which results in the smallest boundary box.

d) In another example of cost fit analysis the distance from the detection around which the box or line 17 was rotated (detection A3 in FIG. 6) to the detection which defined the orientation candidate (detection A5 in FIG. 6) is determined in each case. These candidates with the largest value is selected. This is because shorter distance is worse—it may increase instability of angle update—small distance means sometimes huge angles.

In general, the cost of specific fit corresponding to orientation candidate may be calculated as: cost=Cx, where: C is a horizontal vector of non-negative weights assigned to each factor; x is a vertical vector of non-negative factors expressed as scalars. (e.g. a selection of factors from the methods of cost fit a) b) c) and d) listed above). In more advance solution Cx term may be replaced with more complicated, nonlinear function (e.g. sigmoid function). This enhancement allows to represent more complicated and sophisticated features representation similar to that used in neural networks applications. Purpose of use of such functions is to impact cost of fit in controlled (bounded) way or represent features of objects (like width or length) with no sharp constrains. Cost function then may be represented as: cost=$f_{(x)}$ where: $f_{(x)}$–may be arbitrary metric of x.

Depending on calibration, the initial orientation estimate (reference angle) itself may be treated as an orientation candidate.

Example

Figure 11:
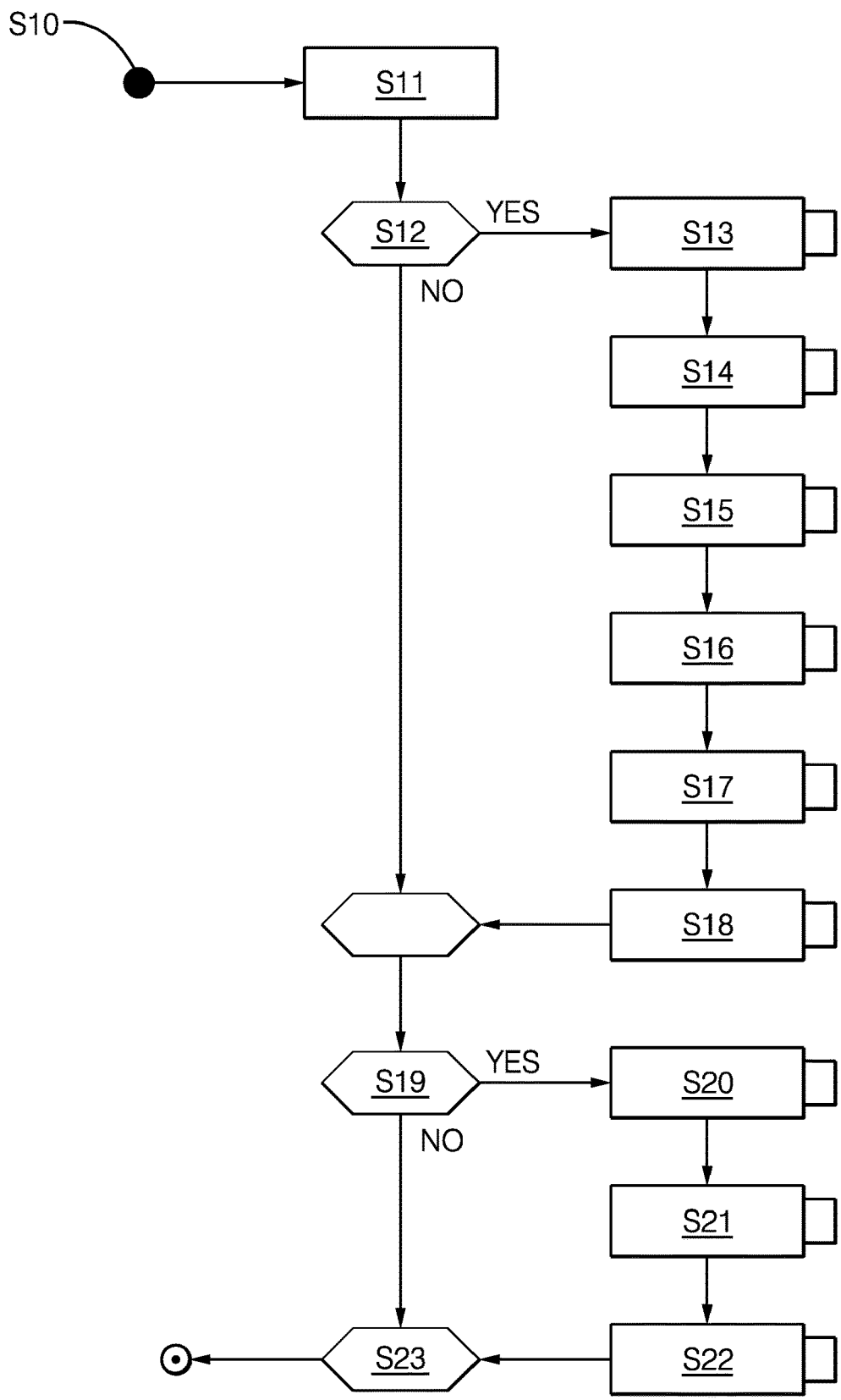
FIGS. 11, 12 and 13 shows flowcharts illustrating methodology of an example of the invention.

The methodology was implemented, which produces a list of pseudo-measurements from a set of detections captured in a single time instance. In this application, the GBO uses as reference angles the velocity angle estimation from the Cloud Algorithm and heading estimate of the associated tracked object. The process is shown in FIG. 11. In step S10 the process begins. In step S11 an array is reset with heading candidates. In step S12 it is determined if there is a valid velocity angle. If not the process proceeds to step S18. If so the process moves to steps S13, S14, S15, S16, S17 and S18 which are: align detections, find heading candidates, evaluate the cost of fit, find the lowest cost of fit (=cost of fit for velocity angle), determine best heading candidate (velocity profile), and evaluate heading candidates respectively. After the process proceeds to step S19 where it is determined if there is a valid heading angle of associated tracker object. If not the process moves to step S23. If so the process move to steps S20, S21 and S21 which are the steps of angle of aligning detections; finding heading candidates, and evaluating heading candidates. The process then moves to the final step S22. This then is an overview of the Geometry Based Orientation algorithm applied in the OH feature. The algorithm uses velocity angle and tracker heading as reference angles for identifying correction candidates. In FIG. 7 a high-level description of the implementation of the GBO algorithm is presented.

Figure 12:
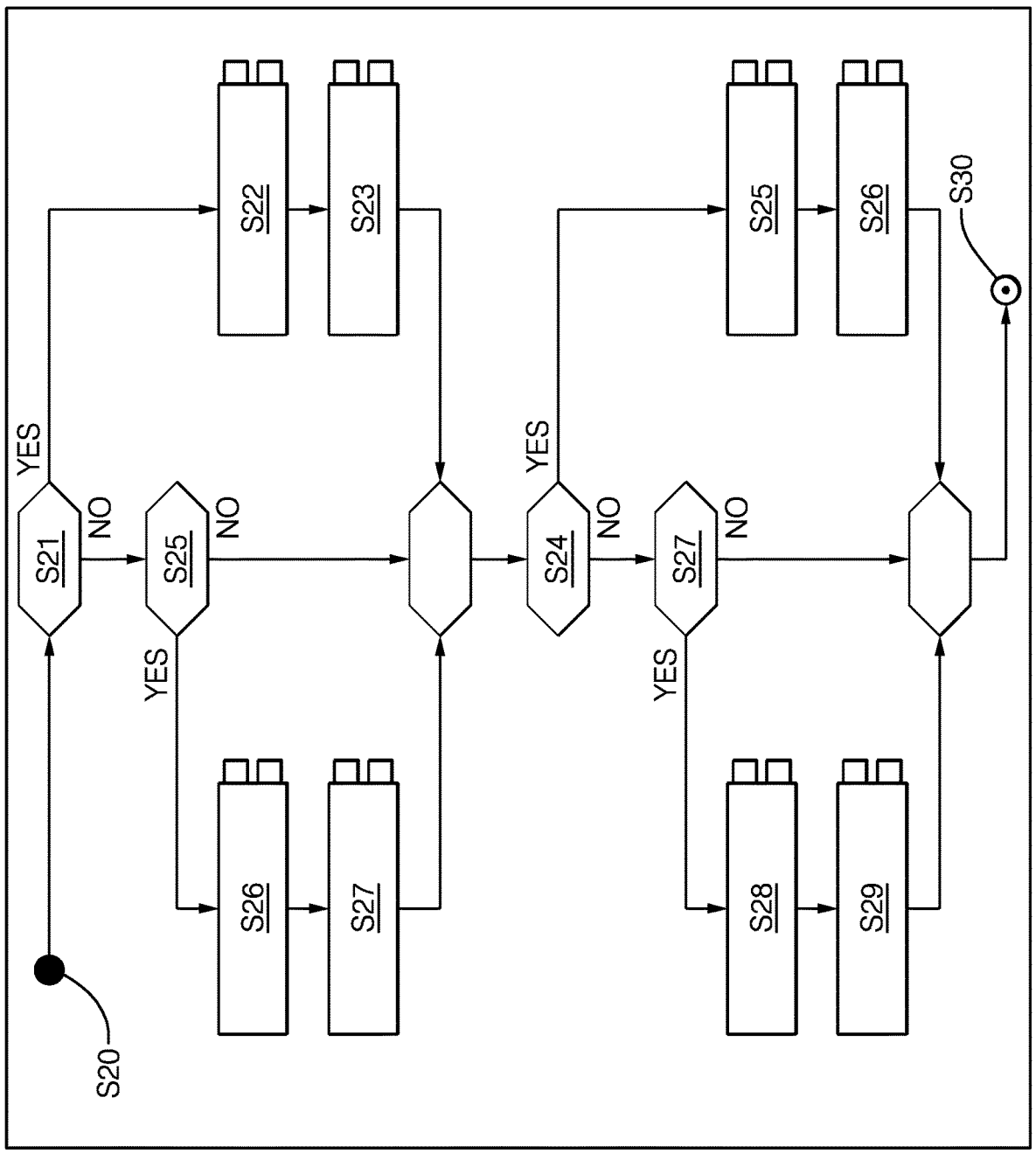
Figure 13:
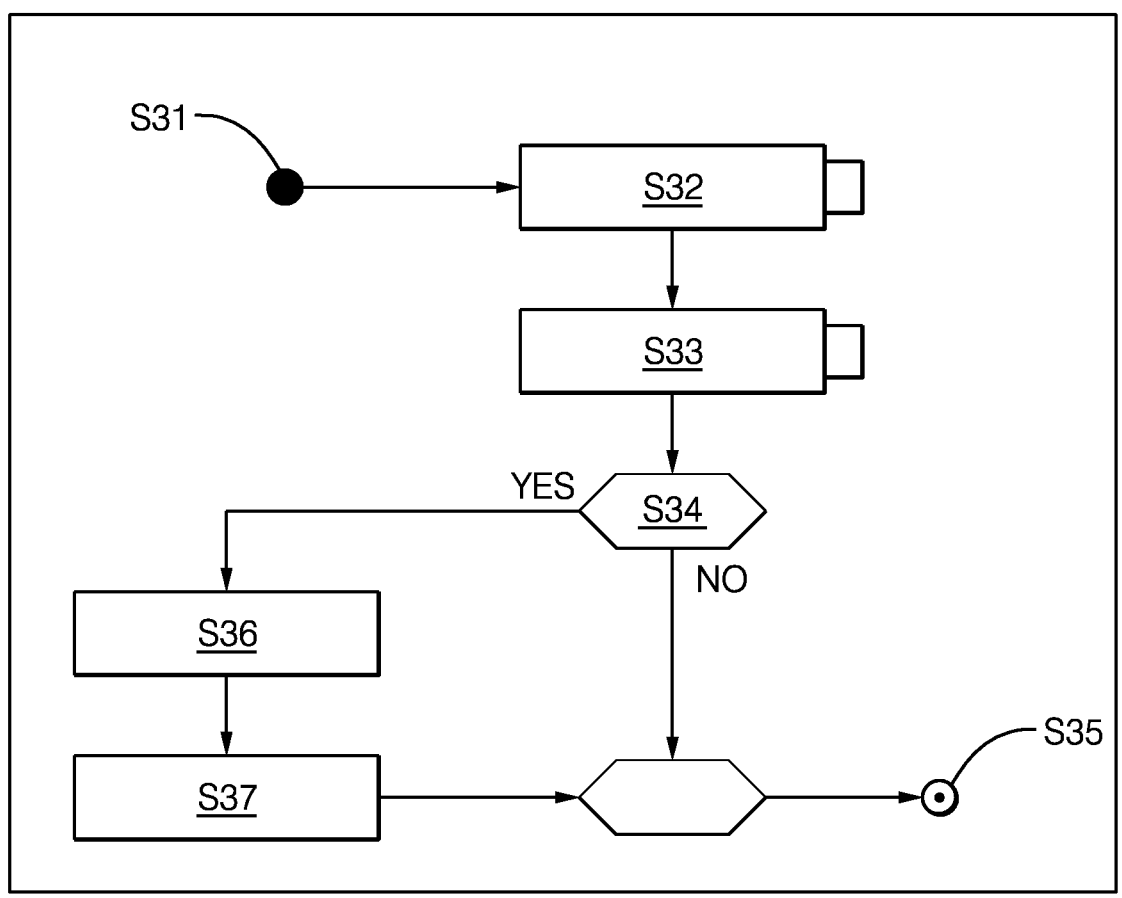

FIGS. 12 and 13 specific steps of the algorithm are described in details. FIG. 12 shows the procedure of selecting orientation correction candidates. The process starts at step S20 and moves to step 21 where it is determined if the right side of original boundary box is viable. If so the process moves to step S22 and S23 where S22 is perform rotation on right side clockwise one side and S23 which is perform rotation on right side anticlockwise respectively. The method then moves to step S24. If at step S21 the answer is no the process move to step S25 where it is determined if the left side of the original boundary box is viable. If so the process performs step S26 and 27 which are performing rotation of the left side clockwise and performing rotation of the left side anticlockwise.

After this the process moves to step S24. At step S24 it is determined if the front edge of the is viable, if so the process moves to steps S25 and S26 which performs rotation of the front side clockwise and performs rotation of the front side anticlockwise. The process then ends at step S30. If not the process moves to steps S27 where it is determined if the rear edge of the original boundary box is viable. If so the process moves to steps S28 and S29 which are perform rotation on the respective side (rear edge) anti-clock wise and clock wise respectively. If so the process performs step S26 and 27 which are performing rotation of the rear end clockwise and performing rotation of the rear end anticlockwise.

FIG. 13 shows method steps for the evaluation of orientation candidates. The process starts sat S31 and at step S32 the detections are aligned (along the heading candidate axis). In the next step S33 the cost function for this heading candidate is evaluated and the process moves to step S34 where it is determined if the current cost of fit is less than the lowest cost of fit. If not the process ends at step S35. If so the process moves to steps S36 and S37 where the best heading candidate is set to the current heading candidate and the lowest cost of fit is set to the current cost of fit respectively.

There are many possible refinements to the method to improve it. In methods tested the cost of fit function was performed using cumulative distance from each detection to its nearest border of the refined bounding box, area of resulting refines boundary box and deviation of heading candidate from reference angle. More factors may be used for improved accuracy of the heading correction. If reference headings will go along with uncertainty of this signals, propagation of that uncertainty may be performed and used for more accurate heading estimation. More advance procedure may be applied for deriving heading candidates, like: using more than one border detection as rotation point. More advance procedure may be applied to optimization of alignment of bounding box, which will use more steps and hypothesis of heading. For example, taking under consideration uncertainty levels of detections. Length and width analysis basing on position in FOV (Field of View). Detection of wheels of a vehicle (wheel spins detection) and using this knowledge to determine more accurate position of target car. Assuming symmetry of target object and projecting nonvisible side from visible side detections.

We claim:

1. A method to determine the heading or orientation of a target vehicle by a host vehicle, said host vehicle equipped with a lidar or radar system, said system including a sensor unit adapted to receive signals emitted from said host vehicle and reflected by said target vehicle, comprising:
   a) determining at least one reference angle being an initial estimate of target heading or orientation ($\beta$);
   b) emitting a signal from said system and determining a plurality of point radar or lidar detections belonging to said a target vehicle, said point detections having co-ordinates in the horizontal plane;
   c) formulating an initial rectangular boundary box from said point detections, where the bounding box is formulated such that such that two edges of the boundary box are drawn parallel to the reference angle and two sides are perpendicular to the reference angle and such that all the detections are either on the bounding box sides or lay within the bounding box and each edge has at least one detection point on it;
   d) for each point on lying on an edge of the boundary box, rotating a line coincident with the respective edge clockwise and anticlockwise until said line intersects another point detection or until a maximum angle of rotation is performed; and each time when said line intersects said another point detection, determining a correction angle $\Delta i$, where the correction angle is such that applied to the reference angle it gives an orientation candidate angle $\gamma i$;
   e) in respect of each orientation candidate angle $\gamma i$/correction angle $\Delta i$, determining a cost function;
   f) selecting that orientation candidate angle having the lowest cost function.

2. The method as claimed in claim 1, wherein step d) is only performed in respect of detection points lying on visible edges.

3. The method as claimed in claim 1, wherein if two values of correction angle ($\Delta i$) are found in respect of respective clockwise and anticlockwise rotation with respect to a detection point, only formulating an orientation candidate from the smallest of the two correction angles ($\Delta i$).

4. The method as claimed in claim 1, wherein step f) comprises selecting the orientation candidate with the smallest value of the correction angle $\Delta i$.

5. The method as claimed in claim 1, wherein step d) determining the distance between the said point on lying on an edge of the initial boundary box, and the point detection intersect by said line, and wherein said step f) selects the orientation candidate angle formulated for the instance where said distance is largest.

6. The method as claimed in claim 1, wherein for each case in step d) when said line intersects said another point detection, formulating a revised boundary box, where one edge of said boundary box is formed coincident with a line from said point lying on said edge of the initial boundary box and said point detection intersect by the said line which is rotated, and where another edge is parallel with said edge of said revised boundary box and the other two edges are perpendicular thereto and such and each edge has at least one detection point on it.

7. The method of claim 6 wherein said cost function is the area of said revised boundary box.

8. The method of claim 6, wherein said cost function is the sum the shortest distance between each point detection not lying on the revised boundary box and its nearest edge.

* * * * *